(12) United States Patent
Ro et al.

(10) Patent No.: US 10,054,817 B2
(45) Date of Patent: Aug. 21, 2018

(54) REFLECTIVE DISPLAY DEVICE

(71) Applicant: SAMSUNG DISPLAY CO., LTD., Yongin-si, Gyeonggi-do (KR)

(72) Inventors: Sungin Ro, Hwaseong-si (KR); Sungjin Kim, Seongnam-si (KR); Seunghyun Park, Seoul (KR); Ocksoo Son, Seoul (KR); Jaehak Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/281,742

(22) Filed: Sep. 30, 2016

(65) Prior Publication Data
US 2017/0176795 A1 Jun. 22, 2017

(30) Foreign Application Priority Data
Dec. 18, 2015 (KR) .................. 10-2015-0181666

(51) Int. Cl.
| *G02F 1/1335* | (2006.01) |
| *G02F 1/1362* | (2006.01) |
| *G02F 1/1368* | (2006.01) |
| *G02F 1/1333* | (2006.01) |
| *G02F 1/133* | (2006.01) |
| *G02F 1/1343* | (2006.01) |

(52) U.S. Cl.
CPC ...... *G02F 1/133553* (2013.01); *G02F 1/1368* (2013.01); *G02F 1/133345* (2013.01); *G02F 1/134336* (2013.01); *G02F 1/136286* (2013.01); *G02F 1/13318* (2013.01); *G02F 1/13439* (2013.01); *G02F 1/133514* (2013.01); *G02F 2201/121* (2013.01); *G02F 2201/123* (2013.01)

(58) Field of Classification Search
CPC ......... G02F 1/133553; G02F 1/133555; G02F 1/133371; G02F 1/133512
See application file for complete search history.

(56) References Cited

U.S. PATENT DOCUMENTS 7,126,662 B2 * 10/2006 Choi .................. G02F 1/13394
349/106

FOREIGN PATENT DOCUMENTS

| JP | 2001154195 A | 6/2001 |
| KR | 1020030025516 A | 3/2003 |
| KR | 1020050095017 A | 9/2005 |

* cited by examiner

*Primary Examiner* — Dung Nguyen
(74) *Attorney, Agent, or Firm* — Cantor Colburn LLP

(57) ABSTRACT

A reflective display device includes: first and second substrates opposing one another; a liquid crystal layer between the first and second substrates; a gate line on the first substrate; a gate insulating layer on the gate line; a data line on the gate insulating layer and intersecting the gate line; a thin film transistor connected to the gate line and the data line; a first passivation layer on the data line and the thin film transistor; a reflective electrode on the first passivation layer; a second passivation layer on the reflective electrode; a pixel electrode on the second passivation layer; a common electrode on the second substrate; and a matrix electrode on at least one of the first and second substrates. The matrix electrode defines a pixel area.

18 Claims, 10 Drawing Sheets

REFLECTIVE DISPLAY DEVICE

This application claims priority to Korean Patent Application No. 10-2015-0181666, filed on Dec. 18, 2015, and all the benefits accruing therefrom under 35 U.S.C. § 119, the content of which in its entirety is herein incorporated by reference.

BACKGROUND

1. Field

Exemplary embodiments of the invention relate to a reflective display device, and more particularly, to a reflective display device in which reflection efficiency is adjusted by a matrix electrode.

2. Description of the Related Art

Display devices are typically classified into liquid crystal display ("LCD") devices, organic light emitting diode ("OLED") display devices, plasma display panel ("PDP") devices, electrophoretic display ("EPD") devices, and the like, based on a light emitting scheme thereof.

Further, display devices may be further classified into various types including reflective display devices based on reflection of ambient light, transmissive display devices which display images using backlight modules, and semi-reflective display devices using reflection of ambient light and backlight modules.

In particular, the reflective display device is relatively more susceptible to ambient light since the reflective display device externally reflects light incident thereto to display an image. For example, the reflective display device may have relatively high visibility in an outdoor environment where ambient light is relatively strong, as compared to the transmissive display device. However, the reflective display device may have relatively low visibility in an indoor environment where ambient light is relatively weak, as compared to the transmissive display device.

SUMMARY

As described above, in a reflective display device, it is desired to efficiently utilize ambient light to enhance the reflection efficiency and color reproduction capability thereof.

Exemplary embodiments of the invention are directed to a reflective display device in which reflection efficiency is adjusted by a matrix electrode.

According to an exemplary embodiment of the invention, a reflective display device includes: first and second substrates opposing one another; a liquid crystal layer between the first and second substrates; a gate line on the first substrate; a gate insulating layer on the gate line; a data line on the gate insulating layer and intersecting the gate line; a thin film transistor connected to the gate line and the data line; a first passivation layer on the data line and the thin film transistor; a reflective electrode on the first passivation layer; a second passivation layer on the reflective electrode; a pixel electrode on the second passivation layer; a common electrode on the second substrate; and a matrix electrode on at least one of the first and second substrates. The matrix electrode defines a pixel area.

In an exemplary embodiment, the matrix electrode may overlap at least a portion of the pixel electrode.

In an exemplary embodiment, the matrix electrode may be a transparent electrode.

In an exemplary embodiment, the matrix electrode may be an opaque electrode.

In an exemplary embodiment, the reflective display device may further include an insulating layer between the matrix electrode and the pixel electrode.

In an exemplary embodiment, the reflective display device may further include an insulating layer between the matrix electrode and the common electrode.

In an exemplary embodiment, the matrix electrode may overlap the gate line.

The matrix electrode may overlap the data line.

The matrix electrode may overlap the thin film transistor.

In an exemplary embodiment, the reflective display device may further include a driving unit which drives the matrix electrode and the common electrode.

In an exemplary embodiment, the matrix electrode may selectively receive a first voltage and a second voltage, where the second voltage has a voltage level different from a voltage level of the first voltage.

In an exemplary embodiment, the first voltage may have a same voltage level as a voltage level of a common voltage applied to the common electrode.

In an exemplary embodiment, the driving unit may be disposed at one side of the first substrate.

In an exemplary embodiment, the common electrode may include a first short-circuit unit connected to the driving unit.

In an exemplary embodiment, the matrix electrode may include a second short-circuit unit connected to the driving unit.

In an exemplary embodiment, the first short-circuit unit may be disposed at a corner portion of the common electrode.

In an exemplary embodiment, the second short-circuit unit may be spaced apart from the first short-circuit unit in a top plan view.

In an exemplary embodiment, the reflective display device may further include a color filter layer between the common electrode and the second substrate.

According to another exemplary embodiment of the invention, a reflective display device includes: first and second substrates opposing one another; a liquid crystal layer between the first and second substrates; a gate line on the first substrate; a gate insulating layer on the gate line; a data line on the gate insulating layer and intersecting the gate line; a thin film transistor connected to the gate line and the data line; a first passivation layer on the data line and the thin film transistor; a reflective electrode on the first passivation layer; a second passivation layer on the reflective electrode; a pixel electrode on the second passivation layer; and a matrix electrode on at least one of the first and second substrates, the matrix electrode defining a pixel area. In such an embodiment, the reflective electrode is a common electrode.

BRIEF DESCRIPTION OF THE DRAWINGS

The above and other features and exemplary embodiments of the invention of invention will be more clearly understood from the following detailed description taken in conjunction with the accompanying drawings, in which.

DETAILED DESCRIPTION

Figure 1:
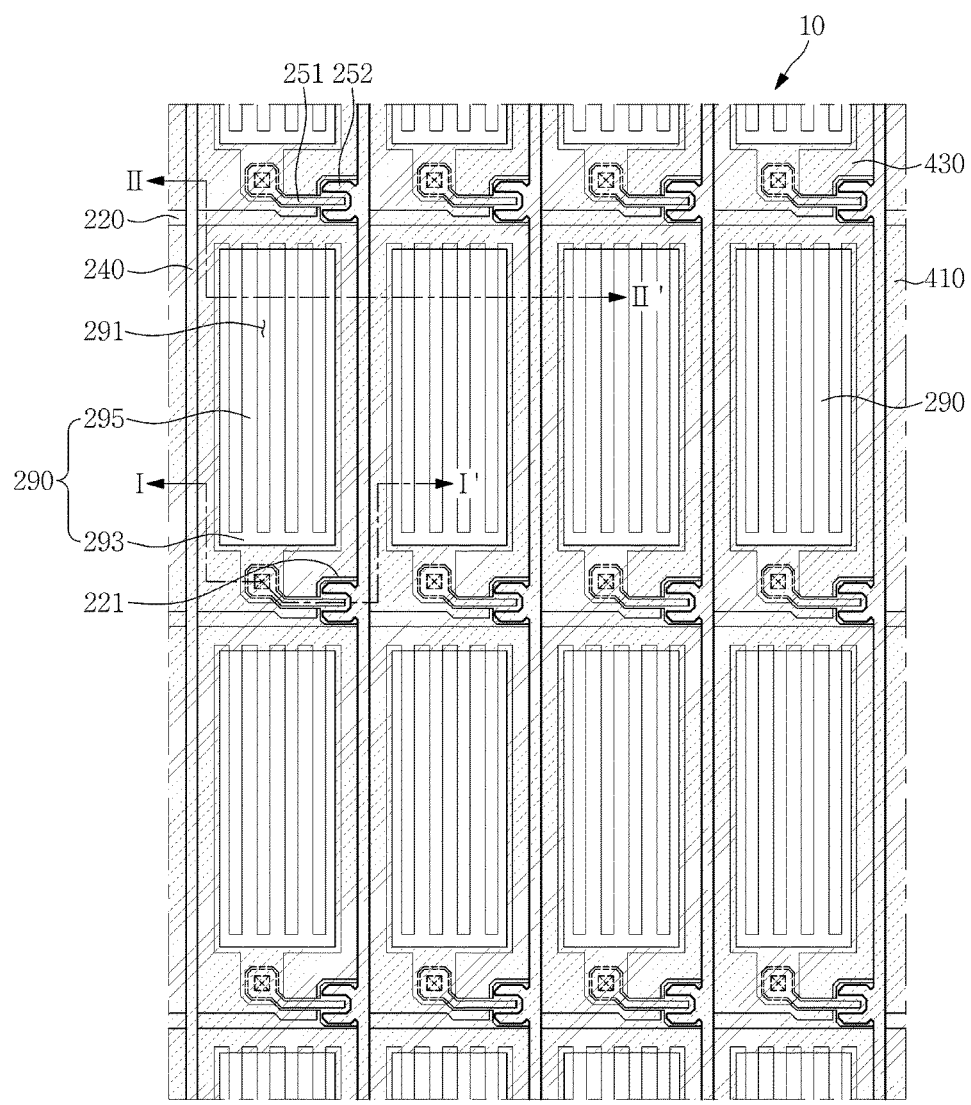
FIG. 1 is a plan view illustrating an exemplary embodiment of a pixel area of a reflective display device.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

For ease of description, in the drawings, certain elements or shapes may be simplified or exaggerated to better illustrate the present invention, and other elements present in an actual product may also be omitted. Thus, the drawings are intended to facilitate the understanding of the present invention. Like reference numerals refer to like elements throughout the specification.

Throughout the specification, when an element is referred to as being "connected" to another element, the element is "directly connected" to the other element, or "electrically connected" to the other element with one or more intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

It will be understood that when an element is referred to as being "on" another element, it can be directly on the other element or intervening elements may be present therebetween. In contrast, when an element is referred to as being "directly on" another element, there are no intervening elements present.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

An exemplary embodiment of a reflective display device 10 will now be described with reference to FIGS. 1, 2, 3, and 4.

Figure 2:
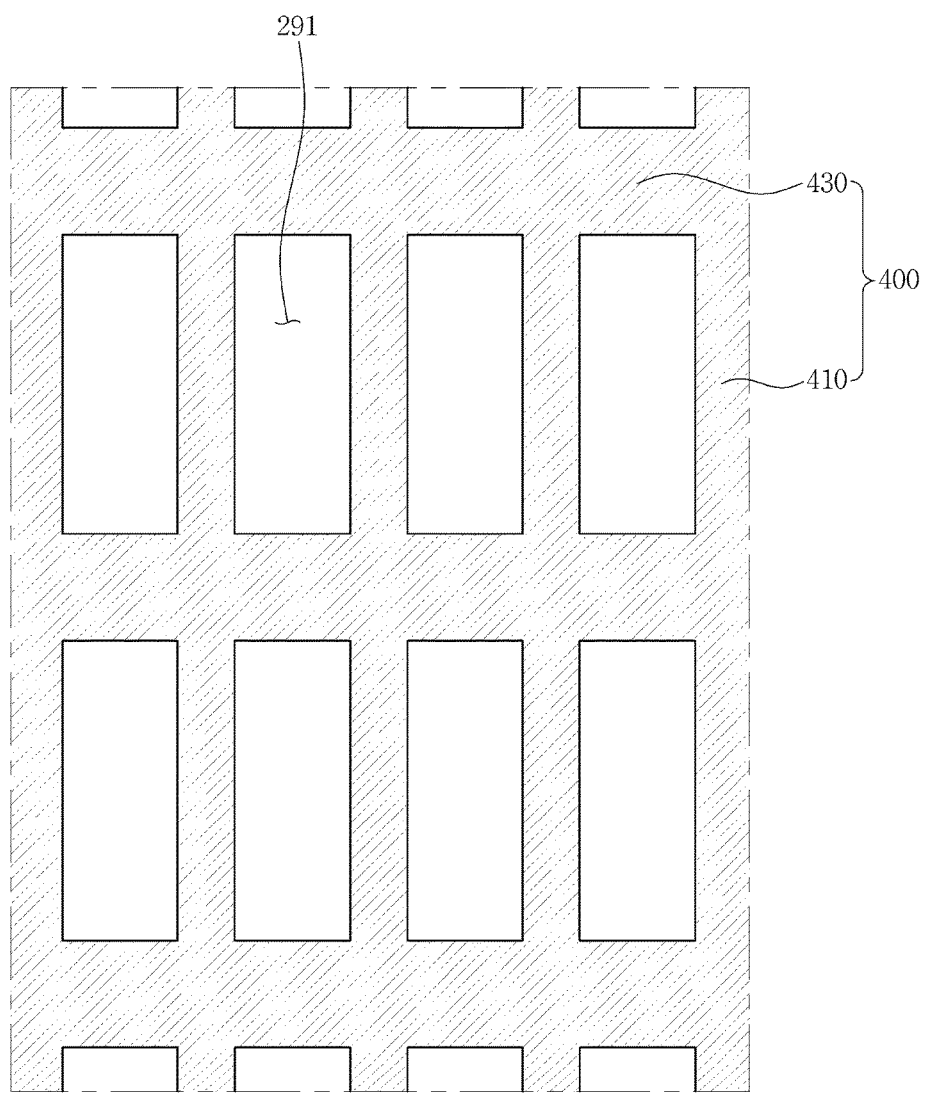
FIG. 2 is a plan view illustrating an exemplary embodiment of a disposition of matrix electrodes illustrated in FIG. 1.
Figure 3:
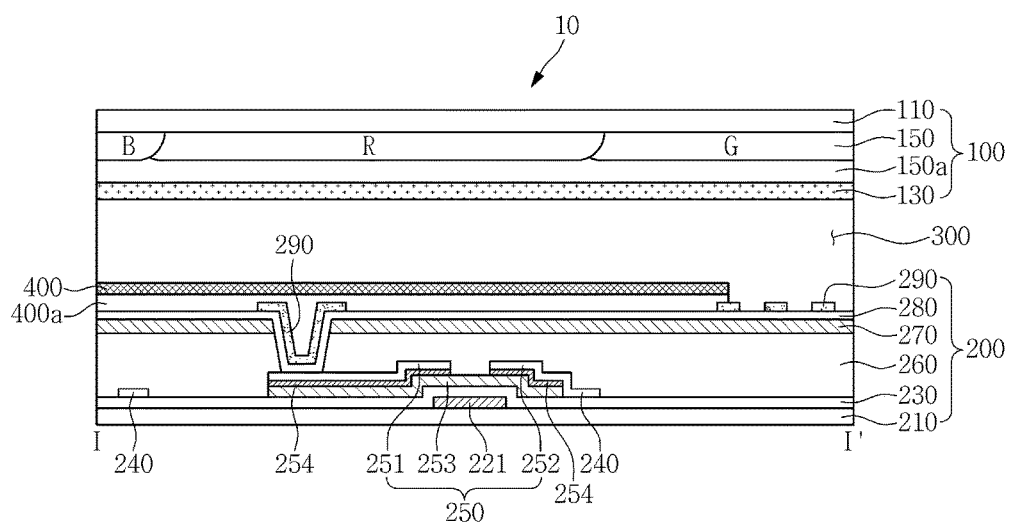
FIG. 3 is a cross-sectional view taken along line I-I' of FIG. 1.
Figure 4:
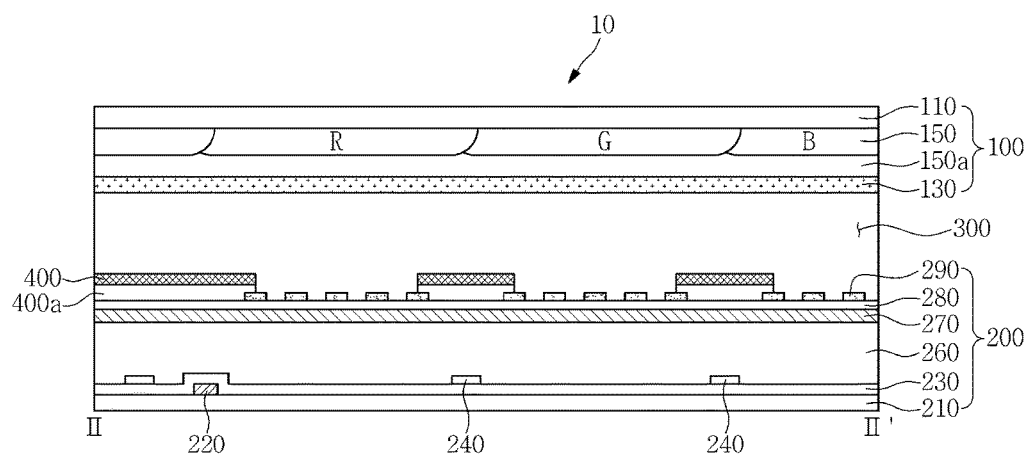
FIG. 4 is a cross-sectional view taken along line II-II' of FIG. 1.

FIG. 1 is a plan view illustrating an exemplary embodiment of a pixel area of a reflective display device. FIG. 2 is a plan view illustrating an exemplary embodiment of a disposition of matrix electrodes illustrated in FIG. 1. FIG. 3 is a cross-sectional view taken along line I-I' of FIG. 1. FIG. 4 is a cross-sectional view taken along line II-II' of FIG. 1.

Referring to FIGS. 1 to 4, an exemplary embodiment of the reflective display device 10 includes an upper panel 100, a lower panel 200 and a liquid crystal layer 300 disposed between the upper panel 100 and the lower panel 200.

In an exemplary embodiment, the lower panel 200 may include a first substrate 210, a gate line 220, a gate insulating layer 230, a data line 240, a thin film transistor 250, a first passivation layer 260, a reflective electrode 270, a second passivation layer 280, a pixel electrode 290, and a matrix electrode 400.

The first substrate 210 may be an insulating substrate. The first substrate 210 may include plastic or transparent glass, e.g., soda lime glass or borosilicate glass.

The gate line 220, which transmits a gate signal, may be disposed on the first substrate 210. The gate line 220 extends in a direction, e.g., in a horizontal or transverse direction. The gate line 220 is connected to the thin film transistor 250 which will be described in detail below.

The gate line 220 may include an aluminum (Al) based metal such as Al or an Al alloy, a silver (Ag) based metal such as Ag or an Ag alloy, a copper (Cu) based metal such as Cu or an Cu alloy, a molybdenum (Mo) based metal such as Mo or a Mo alloy, chromium (Cr), titanium (Ti), or tantalum (Ta), for example.

In an exemplary embodiment, the gate lines 220 may have a multilayer structure including at least two conductive layers having different physical properties from one another.

In such an embodiment, one of the two conductive layers may include a metal having relatively low resistivity, e.g., an Al-based metal, an Ag-based metal or a Cu-based metal, which may reduce or eliminate a signal delay or a voltage drop of the gate line 220.

In such an embodiment, the other of the two conductive layers may include a material, e.g., a Mo-based metal, Cr, Ti or Ta, which may have a relatively high contact property with respect to a transparent conductive oxide ("TCO") such as indium-tin oxide ("ITO"), indium-zinc oxide ("IZO"), or aluminum-zinc oxide ("AZO").

In an exemplary embodiment, the data line 240 extends in a direction, e.g., in a vertical or longitudinal direction, to intersect the gate line 220. The data line 240 is connected to the thin film transistor 250. In such an embodiment, the data line 240 may include a protrusion. The data line 240 may be connected to the thin film transistor 250 through the protrusion. The protrusion may correspond to or define a source electrode 252 which will be described in detail below. The data line 240 applies a data signal voltage to the pixel electrode 290, which will be described in detail below, through the thin film transistor 250.

In an exemplary embodiment, the gate insulating layer 230 may be disposed between the gate line 220 and the data line 240. The gate insulating layer 230 is disposed over an entire surface of the first substrate 210 to cover and thereby insulate the gate line 220. The gate insulating layer 230 may include silicon oxide ($SiO_x$) or silicon nitride ($SiN_x$). The gate insulating layer 230 may have a multilayer structure including at least two insulating layers having different physical properties.

In such an embodiment, the gate insulating layer 230 may serve to prevent a short-circuit between the gate lines 220. In such an embodiment, the gate insulating layer 230 serves to insulate the gate line 220 from another conductive thin film that is disposed on the gate line 220.

The thin film transistor 250 may include a semiconductor layer 253, the source electrode 252, a drain electrode 251, and a gate electrode 221. The source electrode 252 may be defined by the protrusion of the data line 240. The drain electrode 251 overlaps at least a portion of the pixel electrode 290, and the gate electrode 221 may be defined by a protruded portion of the gate line 220.

Accordingly, the source electrode 252 connects the thin film transistor 250 and the data line 240 to one another, and the drain electrode 251 connects the thin film transistor 250 and the pixel electrode 290 to one another. In addition, the gate electrode 221 connects the thin film transistor 250 and the gate line 220 to one another.

In an exemplary embodiment, the gate electrode 221 is disposed below the semiconductor layer 253 to overlap the semiconductor layer 253. In such an embodiment, a channel, through which a current flows, may be defined in the semiconductor layer 253.

An ohmic contact layer 254 may be disposed on the semiconductor layer 253. The ohmic contact layer 254 may increase a contact property between the semiconductor layer 253 and the source electrode 252 and/or the drain electrode 251.

In an exemplary embodiment, for example, the ohmic contact layer 254 may include amorphous silicon doped with n-type impurities (n+ a-Si) at relatively high-concentration. In an alternative exemplary embodiment, where the contact property between the semiconductor layer 253 and the source electrode 252 and/or the drain electrode 251 is sufficiently secured, the ohmic contact layer 254 may be omitted.

The first passivation layer 260 may be disposed on the thin film transistor 250, the data line 240, and the gate insulating layer 230. In an exemplary embodiment, the first passivation layer 260 may have a single layer structure or a multi-layer structure including, for example, silicon oxide, silicon nitride, a photosensitive organic material, or a low dielectric constant (low-k) insulating material, e.g., a-Si:C:O or a-Si:O:F.

The first passivation layer 260 covers the thin film transistor 250, the data line 240 and the gate insulating layer 230 to prevent detachment thereof and insulate the thin film transistor 250, the data line 240, and the gate insulating layer 230 from another conductive material disposed on the first passivation layer 260.

In an exemplary embodiment, the reflective electrode 270 is disposed on the first passivation layer 260. The reflective electrode 270 may cover an entire surface of the first passivation layer 260. In such an embodiment, the reflective electrode 270 may have a planar shape. The reflective electrode 270 may increase visibility by reflecting ambient light incident to the reflective display device 10.

The reflective electrode 270 may include at least one selected from silver (Ag), magnesium (Mg), aluminum (Al), platinum (Pt), palladium (Pd), gold (Au), nickel (Ni), and iridium (Ir), or an alloy including at least two thereof.

In an alternative exemplary embodiment, although not illustrated, the reflective electrode 270 may include a first reflective electrode including at least one selected from silver (Ag), magnesium (Mg), aluminum (Al), platinum (Pt), palladium (Pd), gold (Au), nickel (Ni), and iridium (Ir) or an alloy including at least two thereof, and a second reflective electrode on the first reflective electrode and including a transparent conductive material, e.g., ITO, IZO, and zinc oxide (ZnO).

The second passivation layer 280 may be disposed on the reflective electrode 270. The second passivation layer 280 may have a single layer structure or a multi-layer structure including, for example, silicon oxide, silicon nitride, a photosensitive organic material, or a low dielectric constant (low-k) insulating material, e.g., a-Si:C:O or a-Si:O:F. The second passivation layer 280 covers the reflective electrode 270 to prevent detachment thereof and insulate the reflective electrode 270 from another conductive material on the second passivation layer 280.

The pixel electrode 290 may be disposed on the second passivation layer 280. The reflective electrode 270 is disposed below the pixel electrode 290 to overlap the pixel electrode 290. The pixel electrode 290 is physically separated or spaced apart from the reflective electrode 270 by the second passivation layer 280. The pixel electrode 290 may have a planar or a linear shape. In such an embodiment, the plurality of pixel electrodes 290 may be spaced apart from one another on the second passivation layer 280.

Referring to FIG. 1, the pixel electrode 290 may include a stem electrode 293 having a linear shape and a branch electrode 295 having a linear shape. The stem electrode 293 extends in a direction, e.g., in the horizontal or transverse direction. In an exemplary embodiment, the stem electrode 293 is substantially parallel to the gate line 220. The stem electrode 293 includes a protruded portion to be connected to the thin film transistor 250.

The branch electrode 295 protrudes from the stem electrode 293, e.g., in the vertical or longitudinal direction. In an exemplary embodiment, the branch electrode 295 is substantially parallel to the data line 240. In an exemplary embodiment, the branch electrode 295 may include a plurality of branch electrodes. In such an embodiment, the plurality of branch electrodes 295 may be spaced apart from one another, and may extend in a direction perpendicular to the stem electrode 293.

In an exemplary embodiment, the pixel electrode 290 may include TCO, e.g., ITO, IZO, or AZO.

The matrix electrode 400 may be disposed between the pixel electrodes 290 to define a pixel area 291. The matrix electrode 400 may be disposed on at least one of the first substrate 210 and a second substrate 110 which will be described in detail below.

Referring to FIGS. 1 and 2, in an exemplary embodiment, the matrix electrode 400 may include a vertical matrix electrode 410 and a horizontal matrix electrode 430. The vertical matrix electrode 410 is disposed substantially parallel to the data line 240, and the horizontal matrix electrode 430 is disposed substantially parallel to the gate line 220. The vertical matrix electrode 410 and the horizontal matrix electrode 430 intersect one another. The pixel area 291 may be defined by the intersection between the vertical matrix electrode 410 and the horizontal matrix electrode 430. In such an embodiment, the matrix electrode 400 defines the pixel area 291. In an exemplary embodiment, the pixel area is defined as an area exposed through the matrix electrode 400.

In an exemplary embodiment, the data line 240 is disposed below the vertical matrix electrode 410. In such an embodiment, the gate line 220 is disposed below the horizontal matrix electrode 430. The thin film transistor 250 is disposed below at least one of the vertical matrix electrode 410 and the horizontal matrix electrode 430. In such an embodiment, the matrix electrode 400 may overlap the data line 240, the gate line 220, and the thin film transistor 250.

In an exemplary embodiment, the matrix electrode 400 may be a transparent electrode. In such an embodiment, the matrix electrode 400 may include a TCO, e.g., ITO, IZO, or AZO.

In an alternative exemplary embodiment, the matrix electrode 400 may be an opaque electrode. In such an embodiment, the matrix electrode 400 may include one selected from silver (Ag), magnesium (Mg), aluminum (Al), platinum (Pt), palladium (Pd), gold (Au), nickel (Ni) and iridium (Ir), or an alloy including at least two thereof.

In an exemplary embodiment, similar to the reflective electrode 270, the matrix electrode 400 may include a first reflective electrode including at least one selected from silver (Ag), magnesium (Mg), aluminum (Al), platinum (Pt), palladium (Pd), gold (Au), nickel (Ni) and iridium (Ir) or an alloy including at least two thereof, and a second reflective electrode on the first reflective electrode and including at least one selected from a transparent conductive material, e.g., indium-tin oxide ("ITO"), indium-zinc oxide ("IZO"), and zinc oxide (ZnO).

In an alternative exemplary embodiment, the matrix electrode 400 may be disposed on each of the first substrate 210 and the second substrate 110. In such an embodiment, the matrix electrode 400 on the first substrate 210 and the matrix electrode 400 on the second substrate 110 may be different from one another. In one exemplary embodiment, for example, the matrix electrode 400 on the first substrate 210 may be a transparent electrode, and the matrix electrode 400 on the second substrate 110 may be an opaque electrode. In such an embodiment, where the matrix electrode 400 is an opaque electrode, the matrix electrode 400 and the reflective electrode 270 may include the same material as one another.

The upper panel 100 and the lower panel 200 may oppose one another. In an exemplary embodiment, the upper panel 100 may include the second substrate 110 and a common electrode 130 on the second substrate 110.

The second substrate 110 may oppose the first substrate 210. The second substrate 110 may be an insulating substrate, including plastic or transparent glass, e.g., soda lime glass or borosilicate glass.

The common electrode 130 is disposed on the second substrate 110. In an exemplary embodiment, the common electrode 130 is disposed to overlap the pixel electrode 290. In an exemplary embodiment, the common electrode 130 may have a planar shape, including a TCO, e.g., ITO, IZO, or AZO.

Referring to FIGS. 3 and 4, the upper panel 100 may further include a color filter layer 150. In one exemplary embodiment, for example, the color filter layer 150 may be disposed between the second substrate 110 and the common electrode 130. A capping layer 150*a* may be disposed between the color filter layer 150 and the common electrode 130. The capping layer 150*a* protects the color filter layer 150.

Figure 5:
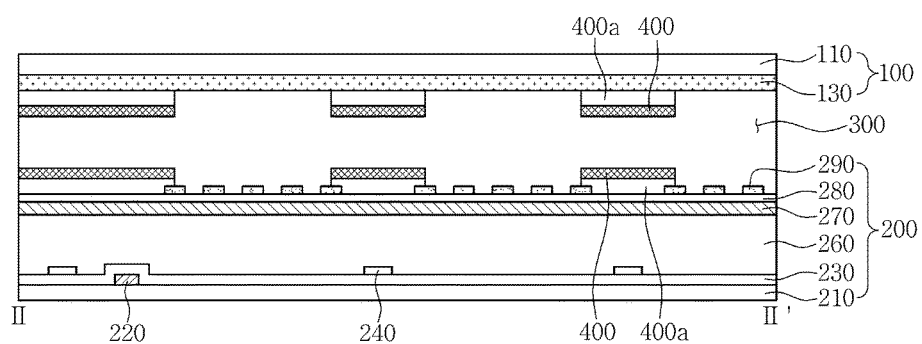
FIG. 5 is a cross-sectional view illustrating an alternative exemplary embodiment of a matrix electrode illustrated in FIG. 1.

FIG. 5 is a cross-sectional view illustrating an alternative exemplary embodiment of the matrix electrode 400 illustrated in FIG. 1.

In an alternative exemplary embodiment, as described above and shown in FIG. 5, a matrix electrode 400 may be disposed on each of the first substrate 210 and the second substrate 110. The matrix electrode 400 on the first substrate 210 and the matrix electrode 400 on the second substrate 110 oppose one another.

In an exemplary embodiment, ambient light is transmitted through the matrix electrode 400 on the second substrate 110. In such an embodiment, ambient light may be reflected by at least one of the matrix electrode 400 on the first substrate 210 and the reflective electrode 270 below the matrix electrode 400.

In such an embodiment, the matrix electrode 400 on the first substrate 210 may be one of a transparent electrode and an opaque electrode. In such an embodiment, the matrix electrode 400 on the second substrate 110 may include a transparent electrode.

An insulating layer 400*a* may be disposed on a surface of the matrix electrode 400. In one exemplary embodiment, for example, the insulating layer 400*a* may be disposed between the matrix electrode 400 and the pixel electrode 290. In an exemplary embodiment, the insulating layer 400*a* may be disposed between the matrix electrode 400 and the second substrate 110 or between the matrix electrode 400 and the common electrode 130 which will be described in detail below. The insulating layer 400*a* insulates between the matrix electrode 400 and the pixel electrode 290 or between the matrix electrode 400 and the common electrode 130. Thus, the matrix electrode 400 may be driven independently of the pixel electrode 290 or the common electrode 130.

Figure 6:
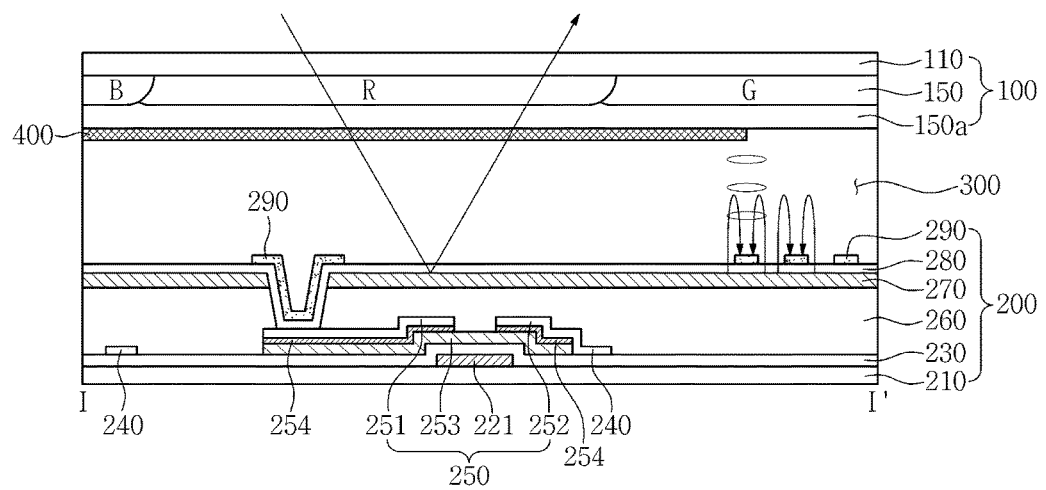
FIGS. 6 and 7 are cross-sectional views illustrating an alternative exemplary embodiment of a reflective electrode illustrated in FIG. 1.
Figure 7:
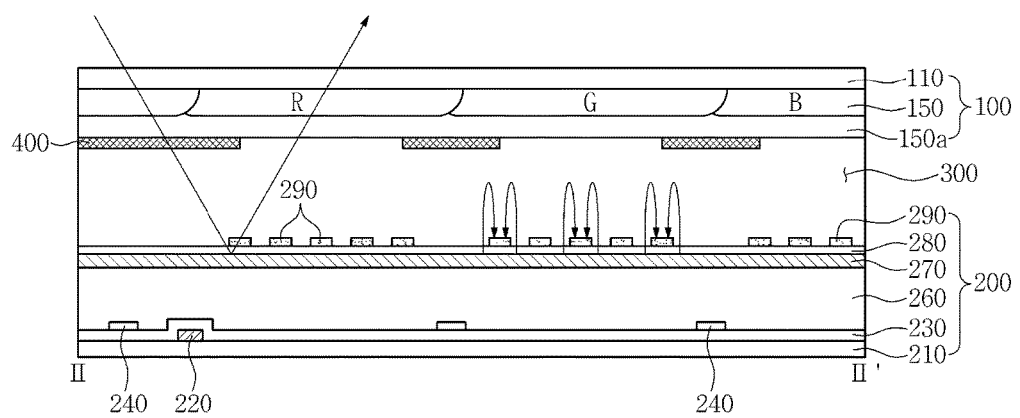

FIGS. 6 and 7 are cross-sectional views illustrating an alternative exemplary embodiment of the reflective electrode 270 illustrated in FIG. 1.

Referring to FIGS. 6 and 7, in an exemplary embodiment, the reflective electrode 270 may be a common electrode. In such an embodiment, the reflective electrode 270 may serve as a common electrode. Accordingly, the common electrode 130 may not be additionally disposed on the first substrate 210 or the second substrate 110.

In an exemplary embodiment, the reflective electrode 270 may have a planar shape, and the pixel electrode 290 may have a linear shape. Accordingly, liquid crystal molecules in the liquid crystal layer 300 may be controlled based on an electric field generated between the reflective electrode 270 and the pixel electrode 290. In such an embodiment, the reflective electrode 270 serves as a common electrode which increases reflection efficiency by reflecting ambient light and controls the liquid crystal layer 300.

In such an embodiment, where the reflective electrode 270 is a common electrode, the matrix electrode 400 may be disposed on the second substrate 110, and may not be disposed on the first substrate 210. In such an embodiment, the matrix electrode 400 on the second substrate 110 may be a transparent electrode or an opaque electrode.

Figure 8:
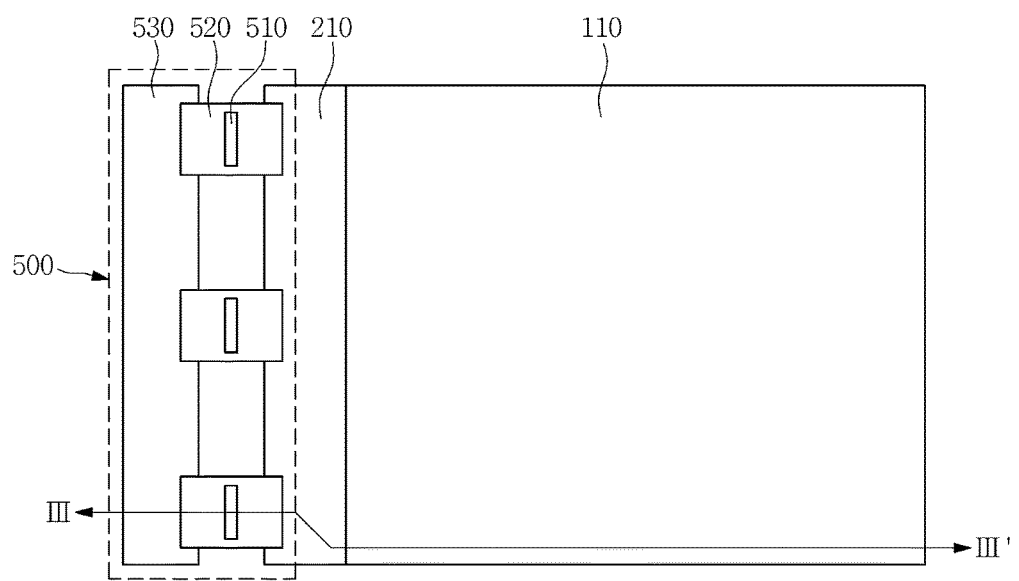
FIG. 8 is a plan view illustrating an alternative exemplary embodiment of a reflective display device.
Figure 9:
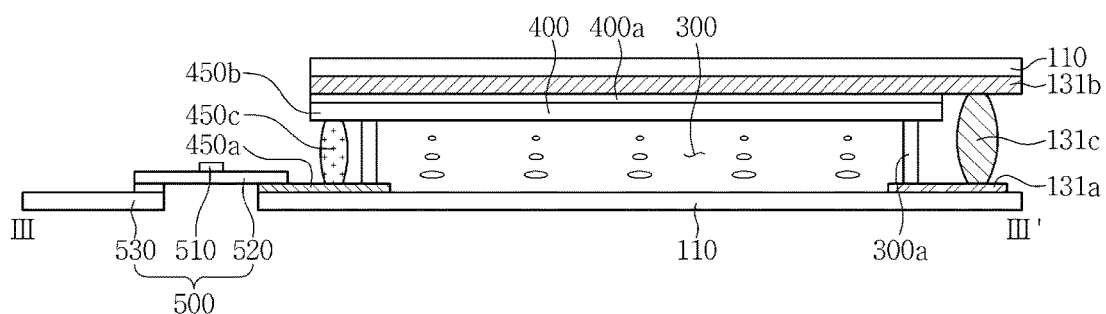
FIG. 9 is a cross-sectional view taken along line III-III' of FIG. 8.
Figure 10:
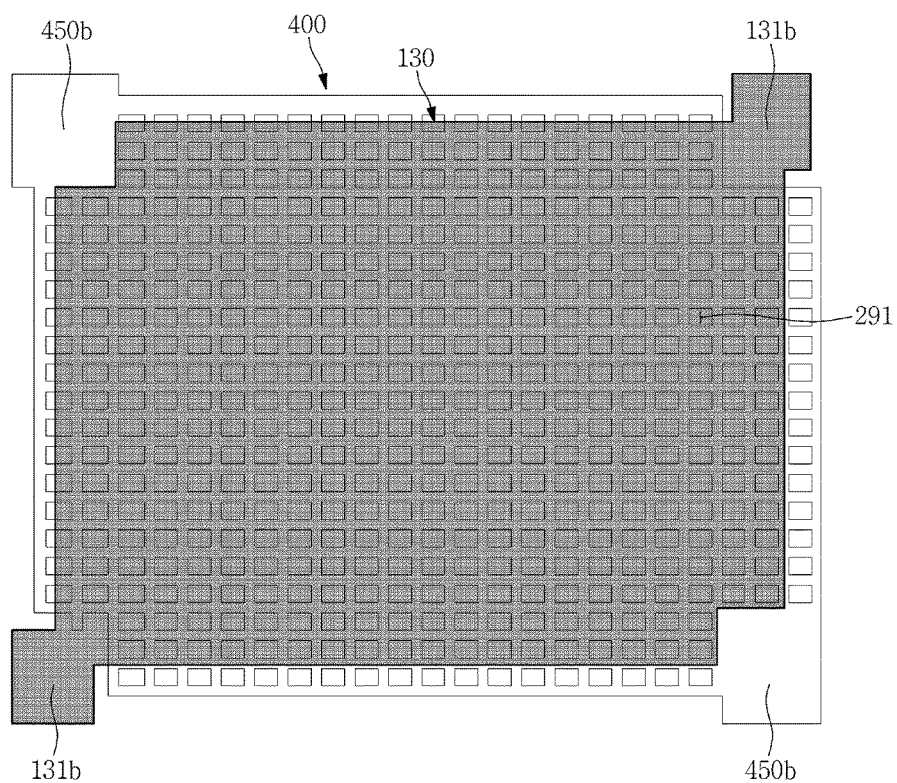
FIG. 10 is a plan view illustrating an alternative exemplary embodiment of a disposition of a matrix electrode and a common electrode illustrated in FIG. 9.

FIG. 8 is a plan view illustrating an alternative exemplary embodiment of a reflective display device 10. FIG. 9 is a cross-sectional view taken along line of FIG. 8. FIG. 10 is a plan view illustrating an alternative exemplary embodiment of a disposition of a matrix electrode 400 and a common electrode 130 illustrated in FIG. 9.

In an exemplary embodiment, the reflective display device 10 may further include a driving unit 500 that drives a pixel electrode 290, a matrix electrode 400, a common electrode 130 and the like.

Referring to FIG. 8, the driving unit 500 may be disposed on a side of the first substrate 210. In such an embodiment, the driving unit 500 may include a circuit substrate 530 including a driving circuit, a tape carrier package ("TCP") 520 connecting the circuit substrate 530 and a first substrate 210, and a driver chip 510 on the TCP 520. The driver chip 510 may supply a driving signal for driving the matrix electrode 400 and the common electrode 130.

Referring to FIGS. 9 and 10, in an exemplary embodiment, the common electrode 130 may include a first short-circuit electrode 131b connected to the driving unit 500. In addition, the matrix electrode 400 may include a second short-circuit electrode 450b connected to the driving unit 500. In such an embodiment, an insulating layer 400a may be disposed between the common electrode 130 and the matrix electrode 400.

The first short electrode 131b may be connected to the first connecting column. The second electrode 450b may be connected to the second connecting column. The first connecting column 131c may be connected to the driving unit 500 through a first connecting line 131a. The second connecting column 450c may be connected to the driving unit 500 through a second connecting line 450a.

In an exemplary embodiment, the first short-circuit electrode 131b may have a planar shape, and may be disposed at a corner portion of the common electrode 130. In an exemplary embodiment, the first short-circuit electrode 131b may include a plurality of short-circuit electrodes. In such an embodiment, the plurality of first short-circuit electrodes 131b may be spaced apart from one another. In one exemplary embodiment, for example, one of the plurality of first short-circuit electrodes 131b may be disposed at a first corner portion of the common electrode 130, and another of the first short-circuit electrodes 131b may be disposed at a second corner portion of the common electrode 130 opposite to the first corner portion.

In an exemplary embodiment, the second short-circuit electrode 450b may have a planar shape, and may be disposed at a corner portion of the matrix electrode 400. In an exemplary embodiment, the second short-circuit electrode 450b may include a plurality of short-circuit electrodes. In such an embodiment, the plurality of second short-circuit electrodes 450b may be spaced apart from one another. In one exemplary embodiment, for example, one of the plurality of second short-circuit electrodes 450b may be disposed at a third corner portion of the matrix electrode 400, and another of the second short-circuit electrodes 450b may be disposed at a fourth corner portion of the common electrode 130 opposite to the third corner portion. In such an embodiment, the first short-circuit electrode 131b and the second short-circuit electrode 450b may be spaced apart from one another in a top plan view.

Hereinafter, an exemplary embodiment of a driving mechanism of the reflective display device 10 will be described.

Referring back to FIGS. 3 and 4, ambient light reflects and scatters off the reflective electrode 270. The matrix electrode 400 may block or transmit ambient light that is reflected and scattered to be directed upwards. To this end, the matrix electrode 400 may selectively receive a first voltage or a second voltage that is applied to the driving unit 500. The second voltage may have a voltage level higher or lower than a level of the first voltage.

Hereinafter, an exemplary embodiment will be described in which light is transmitted through the matrix electrode 400 in the case that a voltage applied to the matrix electrode 400 and a voltage applied to the common electrode 130 have an equivalent voltage level to be equipotential (e.g., normally white state).

In such an embodiment, when the driving unit 500 applies, to the matrix electrode 400, the first voltage having a voltage level equivalent to that of a voltage applied to the common electrode 130, light is transmitted through the matrix electrode 400, since the matrix electrode 400 and the common electrode 130 are equipotential. However, in such an embodiment, when the driving unit 500 applies the second voltage to the matrix electrode 400, the liquid crystal layer 300 may be controlled due to a potential difference between the matrix electrode 400 and the common electrode 130, such that the matrix electrode 400 may block light entirely or partially based on the second voltage.

Accordingly, the matrix electrode 400 may be driven based on a first mode in which a text is displayed and a second mode in which an image or a video is displayed. In an exemplary embodiment, in the first mode, the first voltage may be applied to the matrix electrode 400 so that reflectivity increases. In such an embodiment, in the second mode, the second voltage may be applied to the matrix electrode 400 to block light so that color reproducibility may be improved.

As set forth above, according to one or more exemplary embodiments, the liquid crystal layer may be controlled based on a potential difference between the matrix electrode defining the pixel area and the common electrode. Accordingly, light may be transmitted through or blocked by the matrix electrode based on a voltage applied to the matrix electrode.

From the foregoing, it will be appreciated that various exemplary embodiments in accordance with the invention have been described herein for purposes of illustration, and that various modifications may be made without departing from the scope and spirit of the teachings. Accordingly, the various exemplary embodiments disclosed herein are not intended to be limiting of the true scope and spirit of the teachings. Various features of the above described and other exemplary embodiments can be mixed and matched in any manner, to produce further exemplary embodiments consistent with the invention.

What is claimed is:

1. A reflective display device comprising:
   first and second substrates opposing one another;
   a liquid crystal layer between the first and second substrates;
   a gate line on the first substrate;
   a gate insulating layer on the gate line;
   a data line on the gate insulating layer and intersecting the gate line;
   a thin film transistor connected to the gate line and the data line;
   a first passivation layer on the data line and the thin film transistor;
   a reflective electrode on the first passivation layer;
   a second passivation layer on the reflective electrode;
   a pixel electrode on the second passivation layer;
   a common electrode on the second substrate; and
   a matrix electrode on at least one of the first and second substrates,
   wherein the matrix electrode defines a pixel area and selectively receives two different voltage levels.

2. The reflective display device of claim 1, wherein the matrix electrode overlaps at least a portion of the pixel electrode.

3. The reflective display device of claim 2, further comprising:
   an insulating layer between the matrix electrode and the pixel electrode.

4. The reflective display device of claim 2, further comprising:
   an insulating layer between the matrix electrode and the common electrode.

5. The reflective display device of claim 1, wherein the matrix electrode is a transparent electrode.

6. The reflective display device of claim 1, wherein the matrix electrode is an opaque electrode.

7. The reflective display device of claim 1, wherein the matrix electrode overlaps the gate line.

8. The reflective display device of claim 1, wherein the matrix electrode overlaps the data line.

9. The reflective display device of claim 1, wherein the matrix electrode overlaps the thin film transistor.

10. The reflective display device of claim 1, further comprising:
    a driving unit which drives the matrix electrode and the common electrode.

11. The reflective display device of claim 10, wherein
    the matrix electrode selectively receives a first voltage and a second voltage from the driving unit, and
    the second voltage has a voltage level different from a voltage level of the first voltage.

12. The reflective display device of claim 11, wherein the first voltage has a same voltage level as a voltage level of a common voltage applied to the common electrode.

13. The reflective display device of claim 12, wherein the driving unit is disposed at a side of the first substrate.

14. The reflective display device of claim 13, wherein the common electrode comprises a first short-circuit unit connected to the driving unit.

15. The reflective display device of claim 14, wherein the matrix electrode comprises a second short-circuit unit connected to the driving unit.

16. The reflective display device of claim 15, wherein the first short-circuit unit is disposed at a corner portion of the common electrode.

17. The reflective display device of claim 16, wherein the second short-circuit unit is spaced apart from the first short-circuit unit in a top plan view.

18. The reflective display device of claim 17, further comprising:
    a color filter layer between the common electrode and the second substrate.

* * * * *